(12) United States Patent
Kämpf

(10) Patent No.: US 7,317,073 B2
(45) Date of Patent: Jan. 8, 2008

(54) METHOD OF PRODUCING VACUUM IN THE PRODUCTION OF POLYMERS

(75) Inventor: Rudolf Kämpf, Gründau (DE)

(73) Assignee: Lurgi Zimmer GmbH, Frankfurt am Main (DE)

( * ) Notice: Subject to any disclaimer, the term of this patent is extended or adjusted under 35 U.S.C. 154(b) by 93 days.

(21) Appl. No.: 10/554,436

(22) PCT Filed: Mar. 31, 2004

(86) PCT No.: PCT/EP2004/003389

§ 371 (c)(1),
(2), (4) Date: Oct. 24, 2005

(87) PCT Pub. No.: WO2004/096893

PCT Pub. Date: Nov. 11, 2004

(65) Prior Publication Data

US 2006/0247412 A1 Nov. 2, 2006

(30) Foreign Application Priority Data

Apr. 25, 2003 (DE) ................................ 103 18 747

(51) Int. Cl.
*C08F 6/00* (2006.01)

(52) U.S. Cl. .......................... 528/502; 417/49; 417/54; 417/55; 528/196; 528/198; 528/220; 528/271; 528/272

(58) Field of Classification Search .................. 417/49, 417/54, 55; 528/196, 198, 220, 271, 272, 528/502
See application file for complete search history.

(56) References Cited

U.S. PATENT DOCUMENTS 4,758,650 A * 7/1988 Schulz Van Endert ... 528/308.3

* cited by examiner

*Primary Examiner*—Terressa Boykin
(74) *Attorney, Agent, or Firm*—Jonathan Myers; Andrew Wilford

(57) ABSTRACT

A method is disclosed for producing a vacuum and for separating condensable components present in vapor which accumulates during the production of a polymer by melt-phase polycondensation under vacuum. Vapor produced during the production of polymers by melt-phase polycondensation in at least one reaction step under vacuum is drawn off by at least one steam jet vacuum pump with a down stream injection condenser. The steam jet vacuum pump is driven with alkylene carbonate in vapor form and liquid alkylene carbonate is then supplied to the injection condenser as coolant.

11 Claims, 1 Drawing Sheet

METHOD OF PRODUCING VACUUM IN THE PRODUCTION OF POLYMERS

CROSS REFERENCE TO RELATED APPLICATIONS

This application is the US national phase of PCT application PCT/EP2004/003389 filed 31 Mar. 2004 with a claim to the priority of German patent application 10318747.2 itself filed 25 Apr. 2003.

FIELD OF THE INVENTION

The invention relates to a method for producing vacuum and for separating condensable components in the production of polymers such as polyester, polyarylate, polyphosphonate, polysulfone, polyetherketone and polycarbonate by means of melt-phase polycondensation of accumulating vapour in at least one reaction step under vacuum, wherein the suction side of the reaction step is connected to at least one steam jet vacuum pump with a downstream injection condenser.

BACKGROUND OF THE INVENTION

As a result of their exceptional mechanical-technological properties, polymers are widely used in the mechanical engineering industry, in electrical engineering, in the building trade, in the textile industry, in the paints industry and for objects of everyday use. Production takes place either by interface condensation or melt polycondensation by direct polycondensation from dicarboxylic acids and dialcohols or diphenols or by transesterification of the corresponding acid esters. When melt polycondensation is used to produce polycarbonates and polyphosphonates, aromatic dihydroxy compounds, e.g. bis(4-hydroxyphenyl)alkanes, especially bisphenol A, are transesterified with diphenyl carbonate or diarylalkyl phosphonates in the presence of catalysts with the separation of phenol, oligomerised and then subjected to polycondensation. The polycondensation takes place in several reaction steps under increasing vacuum, for example, beginning with a gentle vacuum of |800| mbar, a vacuum of <|100| bar is set for the pre-polycondensation, and a vacuum of <|1| mbar is set in the end step for the polycondensation at a temperature of 220 to 350° C.

When the vacua are produced by means of positive-displacement vacuum pumps followed or preceded by surface condensers to separate the condensable components contained in the vapours produced during the polycondensation, such as phenols, multivalent alcohols, monomer or oligomers, the condensable components are deposited at suitably low condensation temperatures in the surface condensers and/or in the pump and piping system so that interruptions of operation occur. To avoid this disadvantage, coolers with rotating scrapers have been proposed to clean the cooling surfaces. A disadvantage however is that in the event of a leak from the shaft passage which is under vacuum, there is a major risk for operation and product quality. It is also known (SRI Report No. 50B [1982] Polycarbonates, FIG. 5.1) to produce the vacuum by means of two water-vapour operated steam-jet vacuum pumps arranged one after the other in the final stage of the polycondensation whilst retaining the surface condenser. In this case, the waste water is contaminated, for example, by the accumulating phenols, dialcohols and oligomers. In addition, the oligomers are deposited in the steam-jet vacuum pumps.

U.S. Pat. No. 3,468,849 and DE-A-2227261 describe methods for producing polyethylene terephthalate (PET) wherein the vacuum is produced in the final stage of the polycondensation by means of a steam-jet vacuum pump driven by ethylene glycol (EG) vapour at a pressure of approx. |2| bar. EG is liquid at room temperature and boils at a pressure of |2| bar and a temperature of 222° C. whereas the monomeric initial products of the production of polycarbonates, polysulfones, polyether ketones, polyarylates and polyphosphonates are solid at room temperature and have high boiling points of >300° C. at atmospheric pressure; in this case, partly undesirable decomposition and side reactions occur. In the polycondensation of PET, the EG which is both the working medium of the steam-jet vacuum pump and the monomer is separated and accumulates under normal conditions in liquid form.

During the polycondensation of polycarbonates from diphenyl carbonate, of polyarylates from dicarboxylic acids, of polyphosphonates from bisphenols and/or other phenyl esters, various phenols are formed from the monomers or the separation products from the transesterification reaction in the production of polyesters, which are toxic and become solid at a temperature below 41° C. These properties impair the safety of the operation and staff and cause corrosion effects.

The subject matter of DE-A-4440741 is a method for producing a vacuum and separating the condensable components from the vapours of melt-phase polycondensation in the production of polycarbonate. In this method the suction side of a polycondensation stage is connected to at least one to two steam-jet vacuum pumps with a downstream injection condenser. The working vapour is diphenyl carbonate vapour at a pressure of |0.3| to |1.5| bar and the spray liquid is liquid diphenyl carbonate. This method makes it possible to advantageously produce vacuum in one or more reaction stages during the production of polycarbonate by melt-phase polycondensation. Operating interruptions caused by deposition of oligomers or by saturation of surface condensers are almost eliminated. Emissions to be disposed of are reduced to a minimum, in particular no waste water contaminated with phenol, oligomers and monomers accumulates.

OBJECT OF THE INVENTION

Starting from this prior art, it is the object of the present invention to improve the energy efficiency of the method described initially.

SUMMARY OF THE INVENTION

This object is solved by the fact that the steam-jet vacuum pump is acted upon by working vapour consisting of at least one alkylene carbonate in vapour form and/or at least one dialkyl carbonate in vapour form and the injection condenser is acted upon by coolant consisting of at least one liquid alkylene carbonate and/or at least one liquid dialkyl carbonate.

Despite a melting point of about 37° C. and a boiling point of about 248° C. at a pressure of |1| bar, ethylene carbonate is quite especially suitable for solving the object according to the invention in the vapour form as working vapour for the steam-jet vacuum pump and in the liquid form as spray agent for the injection condenser for spray condensation of the high-boiling components of the vapours. It was surprisingly found that ethylene carbonate is suitable for under-cooling and thus can be used in vacuum production installations similarly to the alkyl carbonates such as propylene and butylene carbonate.

The working vapour used for the operation of the steam-jet vacuum pump has a pressure of |0.3| mbar to |9| bar. In order to achieve a relatively high efficiency, the working vapour should have the highest possible pressure. Depending on the dimensions of the installation for producing polyester, polyarylate, polyphosphonate, polysulfone, polyether catone or polycarbonate, a thermally sparing mode of operation may be appropriate at a pressure of |0.5| mbar to |1| bar. At relatively high pressures the use of one steam-jet vacuum pump per reaction stage is generally sufficient whereas at relatively low pressures two steam-jet vacuum pumps are inserted before an injection condenser. The temperature of the working vapour corresponds to the boiling point of the ethylene, propylene and alkylene carbonate at given pressure.

In order to avoid separation of condensable components of the vapours in the steam-jet vacuum pump, it is appropriate to overheat the working vapour before entry into the steam-jet vacuum pump by 1 to 100° C., preferably 3 to 25° C.

The vapour mixture leaving the steam-jet vacuum pump, consisting of working vapour, the separation products of the polycondensation and transesterification such as phenol, dialcohol and other substances and oligomeric polycarbonate contained in the polycondensation vapours, other oligomeric polymer and monomers, is fed into the injection condenser directly adjacent to the steam-jet vacuum pump, and the condensable components are separated therefrom by spraying with liquid alkylene carbonate. Depending on the purity of the spraying agent, its temperature should be as low as possible, at 10 to 200° C., preferably 25 to 150° C., in order to achieve maximum separation of the condensable components.

Within the scope of the embodiment of the invention, a partial mass flow of the condensate flowing away from the injection condenser is fed back into the injection condenser as spraying agent under suitable tempering, a further partial mass flow is fed to the evaporator to produce the working vapour and the residual mass flow is discharged and fed back inside the process or supplied to a recovery plant. An enrichment of oligomers, monomers and separation products of the polycondensation or transesterification is thereby avoided. The condensates of a plurality of injection condensers can initially be brought together and only then divided into the corresponding partial mass flows.

The vapour phase emerging from the first injection condenser has a higher pressure corresponding to the compression ratio of the previously incorporated steam-jet vacuum pump(s) compared with the pressure in the polycondensation stage. Further compression of the vapour phase can be provided by one or a plurality of subsequent compression stages each formed of a steam-jet vacuum pump and injection condenser. It is also possible to replace one or a plurality of the subsequent compression stages consisting of a steam-jet vacuum pump and injection condenser by mechanical vacuum pumps such as a vacuum blower and liquid ring pump. Condensate from the injection condenser or a liquid alkylene carbonate or a mixture of liquid alkylene carbonates or dialkyl carbonates can be used as operating liquid for the liquid ring pump. If necessary, heat exchangers and/or condensers can be interposed. At the same time, the vacuum for the preceding polycondensation stages can be produced using these further compression stages. If mechanical vacuum pumps are used, these can also be used to simultaneously produce the vacuum of the transesterification stage. A further partial flow of condensate from the injection condensers is supplied to the evaporator to produce the working vapour for the steam-jet vacuum pumps. The evaporator can also be operated exclusively using pure alkylene carbonate without returning condensate. The operating pressure of the evaporator is slightly higher than the pressure of the working vapour depending on the pressure loss in the pipes and fittings. In the case of a plurality of compression stages, the working vapour flow emerging from the evaporator is divided into partial flows corresponding to the number of compressor stages. The sump of the evaporator is continuously partially discharged and optionally reused.

Since the alkylene carbonates used in this method have a substantially higher boiling point than the phenols used, simple distillative separation is possible. The method according to the invention allows undisturbed and economical production of vacuum for one or a plurality of polycondensation reaction stages in the production of polyester, polyphosphonate, polysulfone, polyether ketone, polyarylate and polycarbonate by melt-phase polycondensation. Operating interruptions caused by deposition of oligomers are almost eliminated. All valuable substances are recirculated within the process. Emissions to be removed are reduced to a minimum, and in particular no waste water contaminated with phenol, oligomers and monomers accumulates.

BRIEF DESCRIPTION OF THE DRAWING

The method according to the invention is explained in detail and as an example by the flow pattern shown in the drawing.

DETAILED DESCRIPTION OF THE DRAWING

Figure 1:
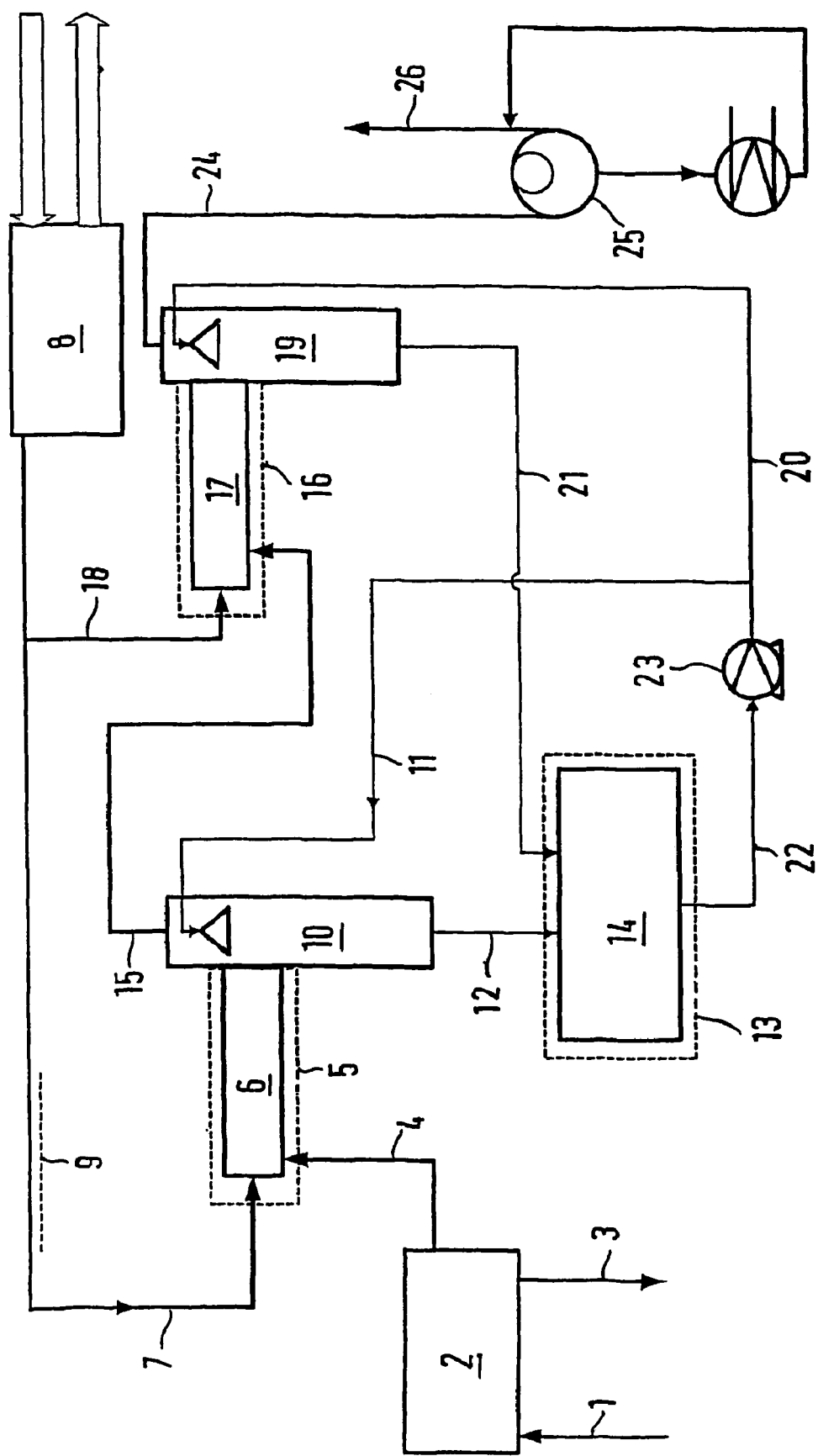

The product removed from a pre-polycondensation reactor not shown is supplied via pipe (1) to the polycondensation reactor (2) where a temperature of 295° C. and a pressure of |2| mbar prevails; the polymer is led out from the polycondensation reactor (2) via pipe (3). The delivery side of the polycondensation reactor (2) is connected via line (4) to the steam-jet vacuum pump (6) provided with heat tracing (5), which is driven by ethylene carbonate vapour supplied via line (7) from the evaporator (8). In order to avoid deposition of components present in the ethylene carbonate vapour in the area of the steam-jet vacuum pump (6), the ethylene carbonate vapour can be overheated using heat tracing (9) surrounding the line (7). The vapour mixture of ethylene carbonate vapour leaving the steam-jet vacuum pump (6) and the polycondensation vapours containing the phenol, oligomeric polycarbonate and monomers is fed into a directly adjacent injection condenser (10) where the condensable components are separated by spraying with liquid ethylene carbonate having a temperature of 40° C. supplied via the line (11). The condensate removed from the injection condenser (10) via line (12) flows into a condensate collector (14) provided with heat tracing (13). The vapour phase flowing out at the head of the injection condenser (10) flows via line (15) to the steam-jet vacuum pump (17) provided with heat tracing (16), which is driven by ethylene carbonate vapour supplied via the line (18) which branches off from the line (9). The vapour mixture of ethylene carbonate vapour leaving the steam-jet vacuum pump (17) and the phenol-containing polycondensation vapour is supplied to an injection condenser (19) and sprayed therein with condensate supplied via line (20). The condensate leaving the injection condenser (19) via line (21) flows into the condensate collector (14). The condensate flowing from the condensate collector (14) via line (22) is fed to the injection condensers (10) or (19) via lines (11) or (20) using the pump unit (23). The vapour phase emerging from the head of the injection condenser (19) flows via line (24) to a liquid ring pump (25) by which means the waste gas is removed from the process via line (26).

The invention claimed is:

1. A method for producing vacuum and for separating condensable components present in vapor which accumulates during the production of a polymer by melt-phase polycondensation under vacuum in at least one reaction step, which comprises the step of:
    (a) effecting a vacuum in a reaction step by means of at least one steam-jet vacuum pump to which a working vapor consisting of at least one alkylene carbonate in vapor form, and/or at least one dialkyl carbonate in vapor form is added together with the vapor which accumulates containing condensable components, resulting in the vapor which accumulates containing condensable components being drawn off and mixed with the working vapor; and
    (b) condensing the condensable components present in the mixture obtained in accordance with step (a) in one downstream injection condenser per steam-jet vacuum pump by spraying the mixture with a coolant consisting of at least one liquid alkylene carbonate and/or at least one liquid dialkyl carbonate to accumulate a condensate as a sump product and a vapor phase as a head product.

2. The method according to claim 1, in which prior to step (a) a melt-phase polycondensation takes place in a plurality of reaction steps wherein the last reaction step is connected to a steam-jet vacuum pump with a downstream injection condenser according to steps (a) and (b).

3. The method according to claim 1, in which prior to step (a) a melt-phase polycondensation takes place in a plurality of reaction steps, wherein the last reaction step and at least one of the preceding reaction step are connected to a steam-jet vacuum pump with a downstream injection condenser according to steps (a) and (b).

4. The method according to claim 1, according to steps (a) and (b) wherein ethylene carbonate and propylene carbonate are used as the alkylene carbonate.

5. The method according to claim 1, according to steps (a) and (b) wherein dimethyl carbonate and diethyl carbonate are used as the dialkyl carbonate.

6. The method according to claim 1 wherein according to step (a) the pressure of the working vapor is |0.3| mbar to |9| bar.

7. The method according to claim 1 wherein prior to step (a) the vapor-phase working vapor is overheated before entering into the steam-jet vacuum pump by 1 to 100° C.

8. The method according to claim 1, step (b) wherein according to step (b) the temperature of the coolant is 10 to 200° C.

9. The method according to claim 1, step (b) wherein a delivery side of at least one injection condenser is connected to a positive-displacement vacuum pump.

10. The method according to claim 1, following step (b) in which from the accumulated condensate, a first partial quantity is fed back into the injection condenser according to step (b), a second partial quantity is fed to an evaporator to produce the working vapor added to the steam jet vacuum pump used according to step (a) and the remainder is returned inside the process or fed to a recovery plant.

11. The method according to claim 1, further comprising the step of passing the vapor phase head product from the injection condenser following step (b) to a second steam jet vacuum pump to be treated with additional working vapor consisting of at least one alkylene carbonate in vapor form, and and/or at least one dialkyl carbonate in vapor form, and passing the resulting mixture of vapors into a second injection condenser in which the mixture of vapors is sprayed with additional coolant consisting of at least one liquid alkylene carbonate and/or at least one liquid dialkyl carbonate to accumulate additional condensate as a sump product and a vapor phase which may be vented as a head product.

* * * * *